(12) United States Patent
Wang et al.

(10) Patent No.: US 11,989,078 B2
(45) Date of Patent: May 21, 2024

(54) VEHICLE CONTROL DEVICE AND METHOD THEREOF

(71) Applicant: INDUSTRIAL TECHNOLOGY RESEARCH INSTITUTE, Hsinchu (TW)

(72) Inventors: Yu-Long Wang, Hsinchu (TW); Nan-Hsiung Tseng, Hsinchu (TW); Yi-Lun Cheng, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 192 days.

(21) Appl. No.: 17/833,935

(22) Filed: Jun. 7, 2022

(65) Prior Publication Data

US 2023/0100219 A1     Mar. 30, 2023

Related U.S. Application Data

(60) Provisional application No. 63/250,291, filed on Sep. 30, 2021.

(51) Int. Cl.
*G06F 11/00* (2006.01)
*B60R 16/02* (2006.01)
(Continued)

(52) U.S. Cl.
CPC ............. *G06F 11/00* (2013.01); *B60R 16/02* (2013.01); *G06F 1/28* (2013.01); *G06F 11/0739* (2013.01);
(Continued)

(58) Field of Classification Search
CPC ............. G06F 11/0739; G06F 11/0757; G06F 11/1441; G06F 1/28; B60R 16/02
See application file for complete search history.

(56) References Cited

U.S. PATENT DOCUMENTS 4,803,682 A * 2/1989 Hara ................... G06F 11/1415
714/E11.132
10,579,484 B2   3/2020 You et al.
(Continued)

FOREIGN PATENT DOCUMENTS

CN     105159200     7/2008
CN     101551671     10/2009
(Continued)

*Primary Examiner* — Marc Duncan
(74) *Attorney, Agent, or Firm* — Amin, Turocy & Watson, LLP

(57) ABSTRACT

A vehicle control device and a method thereof are provided. A master processor and a slave processor simultaneously receive, monitor or process signals of a vehicle, a power management module monitors the master processor via a first watchdog signal, and the master processor monitors the slave processor via a second watchdog signal. When the power management module sends the first watchdog signal to the master processor and no response message is received, the power management module sends a first reset signal to reset the master processor, and when the master processor sends the second watchdog signal to the slave processor and no response message is received, the master processor sends a second reset signal to reset the slave processor. When the master processor and the slave processor are abnormal, a forced wake-up module outputs a high level signal to forcibly wake up the master processor and the slave processor.

20 Claims, 4 Drawing Sheets

(51) Int. Cl.
 *G06F 1/28* (2006.01)
 *G06F 11/07* (2006.01)
 *G06F 11/14* (2006.01)

(52) U.S. Cl.
 CPC ...... *G06F 11/0757* (2013.01); *G06F 11/1441* (2013.01)

(56) References Cited

U.S. PATENT DOCUMENTS

| | | |
|---|---|---|
| 2017/0269984 A1 | 9/2017 | Idapalapati et al. |
| 2018/0105183 A1* | 4/2018 | Kollmer ............... G06F 11/0739 |
| 2020/0364959 A1 | 11/2020 | Badreddine et al. |
| 2021/0096659 A1 | 4/2021 | Park et al. |
| 2022/0222135 A1* | 7/2022 | Quan ................. G06F 11/0739 |

FOREIGN PATENT DOCUMENTS

| | | |
|---|---|---|
| CN | 203643815 | 6/2014 |
| CN | 205620932 | 10/2016 |
| CN | 207571691 | 7/2018 |
| IN | 101615031 | 12/2009 |
| TW | I306241 | 2/2009 |

* cited by examiner

VEHICLE CONTROL DEVICE AND METHOD THEREOF

CROSS-REFERENCE TO RELATED APPLICATIONS

This application claims priority to U.S. Application Ser. No. 63/250,291, filed on Sep. 30, 2021 and Chinese Application Serial No. 202111534396.4 filed on Dec. 15, 2021. The entirety of the above-mentioned patent applications are hereby incorporated by reference herein and made a part of this specification.

BACKGROUND

1. Technical Field

The present disclosure relates to a vehicle control technology, and more particularly, to a vehicle control device and a method thereof.

2. Description of Related Art

With the continuous development of the electronic technology of vehicles, the number of various intelligent vehicle control devices is increasing. However, in the narrow installation space of the vehicle or in the harsh environment, the vehicle control device is easily disturbed or affected by various factors (such as electromagnetic waves, temperature, humidity, noise, impact, aging, etc.), resulting in abnormal (such as failure) situations.

Furthermore, when the power management module is abnormal (such as failure), the reset terminal of the processor is always at a low level, which results in the function failure or abnormality (not operating properly) of the processor, or even causes the vehicle control device or the entire system to stop.

Therefore, how to provide an innovative vehicle control technology to solve any of the above problems has become a major research topic for those skilled in the art.

SUMMARY

The present disclosure provides an innovative vehicle control device and a method thereof, wherein a power management module and a master processor form a safety mechanism circuit to enhance safety, monitoring, reset or forced wake-up capabilities, or a master processor and a slave processor form a safety mechanism circuit to double the reliability of the system or achieve a low failure rate, or a first conversion module, a second conversion module and a comparison module form a monitoring circuit to improve the system judgment ability, or a first logic circuit and a second logic circuit of a forced wake-up module form a forced wake-up circuit to facilitate resetting or forcibly waking up the master processor and/or the slave processor.

A vehicle control device of the present disclosure comprises: a power management module; a master processor and a slave processor simultaneously receiving, monitoring or processing at least one signal of a vehicle, wherein the master processor is respectively connected to the power management module and the slave processor, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and a forced wake-up module respectively connected to the master processor and the slave processor, wherein when the power management module is abnormal (not operating properly) or both the master processor and the slave processor are abnormal (not operating properly), the forced wake-up module outputs a high level signal to a reset terminal of the master processor and a reset terminal of the slave processor to forcibly wake up the master processor and the slave processor.

Another vehicle control device of the present disclosure comprises: a power management module; a master processor and a slave processor simultaneously receiving, monitoring or processing at least one signal of a vehicle, wherein the master processor and the slave processor dynamically adjust a frequency of a first pulse signal and a frequency of a second pulse signal respectively output by the master processor and the slave processor according to a vehicle speed signal of the vehicle, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and a forced wake-up module respectively connected to the master processor and the slave processor, wherein when the power management module is abnormal (not operating properly) or both the master processor and the slave processor are abnormal (not operating properly), the forced wake-up module outputs a high level signal to a reset terminal of the master processor and a reset terminal of the slave processor to forcibly wake up the master processor and the slave processor.

A vehicle control method of the present disclosure comprises: providing a vehicle control device comprising a power management module, a master processor, a slave processor and a forced wake-up module, wherein the master processor is respectively connected to the power management module and the slave processor, and the forced wake-up module is respectively connected to the master processor and the slave processor; simultaneously receiving, monitoring or processing at least one signal of a vehicle by the master processor and the slave processor, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and outputting a high level signal to a reset terminal of the master processor and a reset terminal of the slave processor by the forced wake-up module to forcibly wake up the master processor and the slave processor when the power management module is abnormal (not operating properly) or both the master processor and the slave processor are abnormal (not operating properly).

In order to make the above-mentioned features and advantages of the present disclosure more clear and easy to understand, the following embodiments are given and described in detail with the accompanying drawings. Additional features and advantages of the present disclosure will be set forth in part in the description that follows, and in part will be apparent from the description, or may be learned by practice of the present disclosure. It is to be understood that both the foregoing general description and the following detailed description are exemplary and explanatory and are not intended to limit the scope of the present disclosure as claimed.

DETAILED DESCRIPTIONS

The following describes the implementation of the present disclosure with examples. Those familiar with the art can easily understand the other advantages and effects of the present disclosure from the content disclosed in this specification.

Figure 1:
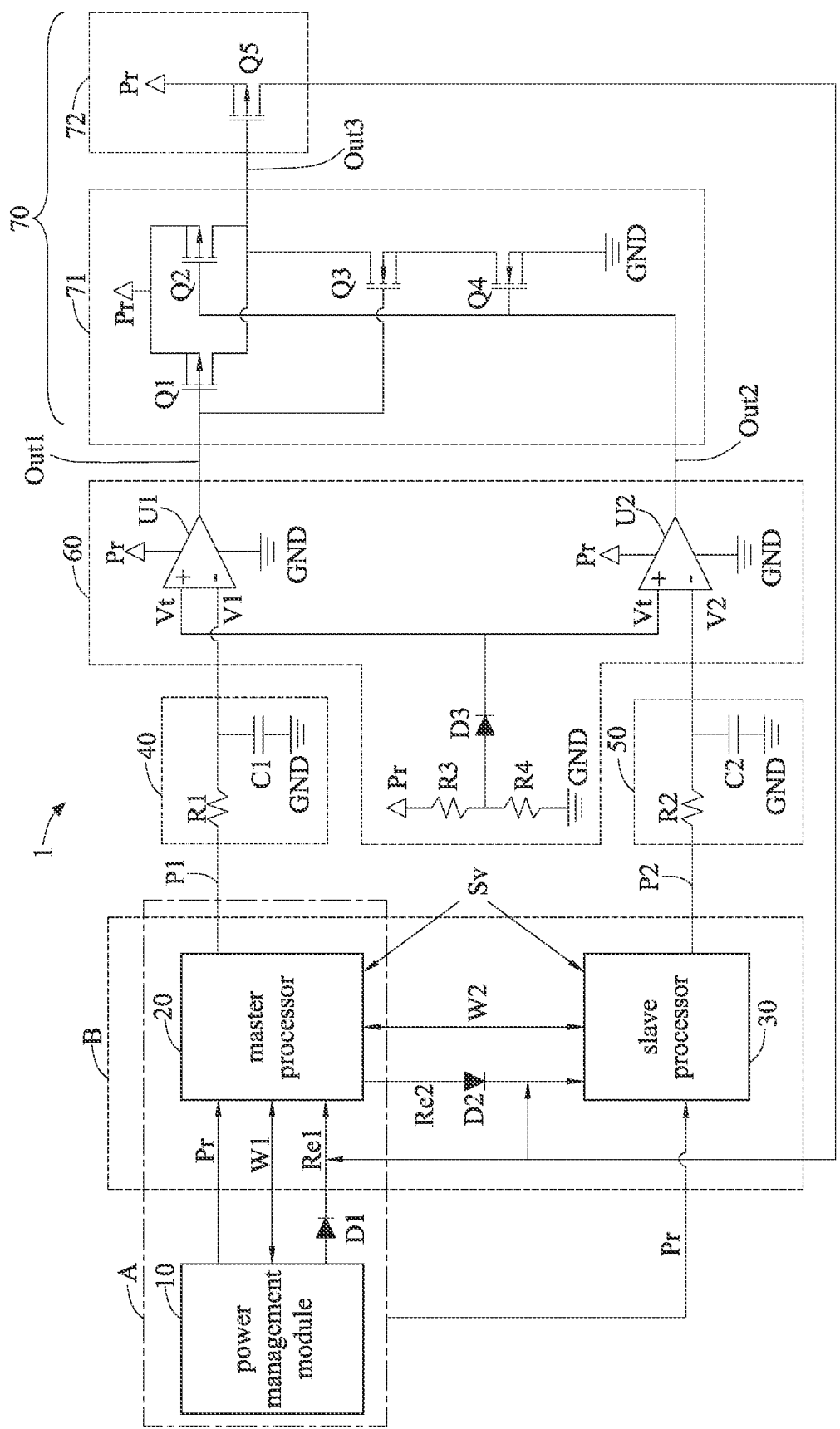
FIG. 1 is a schematic view of a first embodiment of a vehicle control device according to the present disclosure.

FIG. 1 is a schematic view of a first embodiment of a vehicle control device 1 according to the present disclosure. As shown in the figure, the vehicle control device 1 may include a power management module 10, at least one master processor 20, at least one slave processor 30, a first conversion module 40, a second conversion module 50, a comparison module 60 and a forced wake-up module 70, and the forced wake-up module 70 can be composed of a first logic circuit 71 and a second logic circuit 72. Meanwhile, in the present disclosure, "at least one" means one or more (such as one, two or three or more), "plurality" means two or more (such as two, three, four or ten or more), and "connected" means electrical connection or signal connection, etc.

For example, the vehicle control device 1 may be a controller, a control chip (chipset), and a control circuit for a vehicle, and the power management module 10 may be a power manager, a power management chip (PMIC), and a power management circuit, etc. The master processor 20 may be a master microprocessor, a master central processing unit (CPU), or the like, and the slave processor 30 may be a slave microprocessor, a slave central processing unit (CPU), or the like. The first conversion module 40 or the second conversion module 50 may be a converter, a conversion chip, a conversion circuit, or the like. The comparison module 60 may be a comparison chip, a comparison circuit, or the like, and the first logic circuit 71 may be a NAND gate logic circuit or other types of logic circuits, and the like. However, the present disclosure is not limited to this.

The power management module 10 can be connected to the master processor 20, the slave processor 30, the comparison module 60 and the forced wake-up module 70 (the first logic circuit 71 and the second logic circuit 72). The master processor 20 can be further connected to the slave processor 30, the first conversion module 40 or the forced wake-up module 70 (the second logic circuit 72), and the slave processor 30 can be further connected to the second conversion module 50 or the forced wake-up module 70 (the second logic circuit 72). The first conversion module 40 and the second conversion module 50 can be further connected to a first comparator U1 and a second comparator U2 of the comparison module 60, respectively. The comparison module 60 can be further connected to the first logic circuit 71 of the forced wake-up module 70, and the first logic circuit 71 can be further connected to the second logic circuit 72. The power management module 10 can provide a power Pr to the master processor 20, the slave processor 30, the first conversion module 40, the second conversion module 50, the comparison module 60 and the forced wake-up module 70 (the first logic circuit 71 and the second logic circuit 72), etc., and the power Pr may include, for example, one of 1.2 volts (V), 3.3 volts (V), 5 volts (V), or a variety of different powers.

First, the power management module 10 and the master processor 20 form a first safety mechanism circuit A, which is beneficial to improve the security, monitoring, reset or forced wake-up capability between the power management module 10 and the master processor 20. That is, the power management module 10 can monitor the master processor 20 via a first watchdog signal W1, and the first watchdog signal W1 can be a question-and-answer watchdog signal or the like. When the power management module 10 sends the first watchdog signal W1 (for example, a question is sent via the first watchdog signal W1) to the master processor 20, and the master processor 20 does not respond to the power management module 10 with a relevant message in response to the first watchdog signal W1 (e.g., not responding to this question with an answer), the power management module 10 will send a first reset signal Re1 to the master processor 20 for reset.

When the power management module 10 provides the power Pr to the master processor 20, the master processor 20 can output a first pulse signal P1 with a fixed frequency to the first conversion module 40, and the first pulse signal P1 can be a pulse-width modulation (PWM) signal or the like. In addition, a first diode D1 can be disposed between the power management module 10 and a reset terminal of the master processor 20, so as to control or limit the conduction direction of the first reset signal Re1 by the first diode D1, that is, the first reset signal Re1 is directed to the master processor 20 by the first diode D1, so as to prevent the first reset signal Re1 from being directed back to the power management module 10, thereby preventing the power management module 10 from being shorted by the first reset signal Re1.

Second, the master processor 20 and the slave processor 30 form a second safety mechanism circuit B, which is beneficial to improve system reliability or achieve a low failure rate. That is, the master processor 20 and the slave processor 30 can simultaneously receive, monitor or process at least one (or a plurality of) signal Sv of the vehicle based on a double safety mechanism or a redundancy safety mechanism, so as to double the system reliability or achieve a low failure rate. For example, the signal Sv of the vehicle can be various vehicle body signals or sensing signals such as the accelerator signal, the brake signal, the headlight signal, the vehicle temperature signal, the oil temperature signal, the fuel quantity signal, the water temperature signal, the water quantity signal, etc., and the vehicle can be a car, an electric vehicle, a bus (such as an electric bus), a motorcycle (such as an electric motorcycle), etc., but not limited to this.

The master processor 20 can monitor the slave processor 30 via a second watchdog signal W2, and the second watchdog signal W2 can be a question-and-answer watchdog signal or the like. When the master processor 20 sends the second watchdog signal W2 (for example, a question is sent via the second watchdog signal W2) to the slave processor 30, and the slave processor 30 does not respond to the master processor 20 with a relevant message in response to the second watchdog signal W2 (e.g., not responding to this question with an answer), the master processor 20 will send a second reset signal Re2 to the slave processor 30 for reset.

When the power management module 10 provides the power Pr to the slave processor 30, the slave processor 30 can output a second pulse signal P2 with a fixed frequency to the second conversion module 50, and the second pulse signal P2 can be a pulse-width modulation (PWM) signal or the like. In addition, a second diode D2 can be disposed between a reset terminal of the master processor 20 and a reset terminal of the slave processor 30, so as to control or limit the conduction direction of the second reset signal Re2 by the second diode D2, that is, the second reset signal Re2 is directed to the slave processor 30 by the second diode D2, so as to prevent the second reset signal Re2 from being directed back to the master processor 20, thereby preventing the master processor 20 from being shorted by the second reset signal Re2.

Third, the first conversion module 40, the second conversion module 50 and the comparison module 60 form a monitoring circuit, which is beneficial to determine that an output Out1 of the first comparator U1 and an output Out2 of the second comparator U2 are high level (H) or low level (L) and can also effectively improve the system judgment ability. That is, the first conversion module 40 may have a first resistor R1 and a first capacitor C1 connected to each other (e.g., in parallel) to form a first conversion circuit, so as to convert the first pulse signal P1 with a fixed frequency output by the master processor 20 into a first voltage V1 with a fixed voltage value via the first conversion module 40 (such as the first conversion circuit composed of the first resistor R1 and the first capacitor C1). At the same time, the second conversion module 50 may have a second resistor R2 and a second capacitor C2 connected to each other (e.g., in parallel) to form a second conversion circuit, so as to convert the second pulse signal P2 with a fixed frequency output by the slave processor 30 into a second voltage V2 with a fixed voltage value via the second conversion module 50 (such as the second conversion circuit composed of the second resistor R2 and the second capacitor C2).

The comparison module 60 may have a third resistor R3 and a fourth resistor R4 connected to each other (e.g., in parallel) to form a voltage divider circuit, and the third resistor R3 and the fourth resistor R4 may have the same or different resistance values, so as to divide the voltage of the power Pr from the power management module 10 into a threshold voltage Vt with a fixed voltage value via the voltage divider circuit composed of the third resistor R3 and the fourth resistor R4.

The comparison module 60 may have a first comparator U1 and a second comparator U2, and a third diode D3 may also be selectively disposed between the third resistor R3 and the fourth resistor R4, so as to direct the threshold voltage Vt of the power Pr and its current to the first comparator U1 and the second comparator U2 via the third diode D3. Moreover, the third diode D3 can be connected to a first input terminal (e.g., a positive input terminal "+") of the first comparator U1 and a first input terminal (e.g., a positive input terminal "+") of the second comparator U2, respectively, so that the first input terminal (e.g., the positive input terminal "+") of the first comparator U1 and the first input terminal (e.g., the positive input terminal "+") of the second comparator U2 both have the threshold voltage Vt.

The first conversion module 40 (such as the first conversion circuit composed of the first resistor R1 and the first capacitor C1) can be connected to a second input terminal (such as a negative input terminal "−") of the first comparator U1, so that the second input terminal (e.g., the negative input terminal "−") of the first comparator U1 has the first voltage V1 converted by the first conversion module 40. At the same time, the second conversion module 50 (such as the second conversion circuit composed of the second resistor R2 and the second capacitor C2) can be connected to a second input terminal (such as a negative input terminal "−") of the second comparator U2, so that the second input terminal (e.g., the negative input terminal "−") of the second comparator U2 has the second voltage V2 converted by the second conversion module 50.

When the first comparator U1 compares that the first voltage V1 is less than the threshold voltage Vt, the output Out1 of the first comparator U1 is a high level (H); and when the first comparator U1 compares that the first voltage V1 is greater than the threshold voltage Vt, the output of the first comparator U1 is a low level (L). Meanwhile, when the second comparator U2 compares that the second voltage V2 is less than the threshold voltage Vt, the output of the second comparator U2 is a high level (H); and when the second comparator U2 compares that the second voltage V2 is greater than the threshold voltage Vt, the output of the second comparator U2 is a low level (L).

Fourth, the first logic circuit 71 and the second logic circuit 72 of the forced wake-up module 70 form a forced wake-up circuit, which is beneficial to reset or forcibly wake up one or both of the master processor 20 and the slave processor 30. For example, the first logic circuit 71 may have a first P-type transistor Q1, a second P-type transistor Q2, a first N-type transistor Q3, a second N-type transistor Q4, etc., and the second logic circuit 72 may have a third P-type transistor Q5 and the like. The first logic circuit 71 may be a NAND gate logic circuit or the like, and the first P-type transistor Q1, the second P-type transistor Q2 or the third P-type transistor Q5 may be a P-type metal-oxide-semiconductor-field-effect transistor (MOSFET) or the like, and the first N-type transistor Q3 or the second N-type transistor Q4 may be an N-type metal-oxide-semiconductor-field-effect transistor (MOSFET) or the like.

An output terminal of the first comparator U1 is connected to a gate of the first P-type transistor Q1 and a gate of the first N-type transistor Q3, and an output terminal of the second comparator U2 is connected to a gate of the second P-type transistor Q2 and a gate of the second N-type transistor Q4. A source of the first P-type transistor Q1 and a source of the second P-type transistor Q2 are all connected to the power Pr of the power management module 10, and a drain of the first P-type transistor Q1, a drain of the second P-type transistor Q2 and a drain of the first N-type transistor Q3 are all connected to a gate of the third P-type transistor Q5. A source of the first N-type transistor Q3 is connected to a drain of the second N-type transistor Q4, a source of the second N-type transistor Q4 is connected to ground GND, and a source of the third P-type transistor Q5 is connected to the power Pr of the power management module 10, and a drain of the third P-type transistor Q5 is connected to the reset terminal of the master processor 20 and the reset terminal of the slave processor 30.

For example, when an output Out3 of the first logic circuit 71 is a high level (H), the third P-type transistor Q5 is turned off (off). Therefore, the power Pr will not reach the drain of the third P-type transistor Q5 from the source of the third P-type transistor Q5, and will not affect the first reset signal Re1 and the second reset signal Re2. Conversely, when the output Out3 of the first logic circuit 71 is a low level (L), the third P-type transistor Q5 is turned on (on). Therefore, the power Pr of the power management module 10 will reach the drain of the third P-type transistor Q5 from the source of the third P-type transistor Q5, so that the forced wake-up module 70 or the second logic circuit 72 outputs a high level (H) signal to the reset terminal of the master processor 20 and the reset terminal of the slave processor 30 so as to wake up the master processor 20 and the slave processor 30 forcibly.

The following will be as follows: [1] The first condition is that both the master processor 20 and the slave processor 30 are operating normally, [2] The second condition is that one of the master processor 20 and the slave processor 30 is abnormal (not operating properly), [3] The third condition is that both the master processor 20 and the slave processor 30 are abnormal (not operating properly) or the power management module 10 is abnormal (not operating properly), and are described with referring to an input and output table for the three conditions shown in Table 1 below.

Table 1: Input and output table of three conditions. Taking the first logic circuit 71 as a NAND gate logic circuit as an example, the low level (L) and the high level (H) in the input and output table of the following three conditions can respectively correspond to logic "0" and logic "1" in a truth table of the NAND gate.

TABLE 1

| Condition | Output of the first comparator (Out1) | Output of the second comparator (Out2) | Output of the first logic circuit (Out3) | Third P-type transistor (Q5) |
|---|---|---|---|---|
| First | Low level (L) | Low level (L) | High level (H) | Turned off (off) |
| Second | Low level (L) | High level (H) | High level (H) | Turned off (off) |
|  | High level (H) | Low level (L) | High level (H) |  |
| Third | High level (H) | High level (H) | Low level (L) | Turned on (on) |

[1] The first condition is that both the master processor 20 and the slave processor 30 operate normally. When both the master processor 20 and the slave processor 30 operate normally, the master processor 20 and the slave processor 30 respectively output the first pulse signal P1 and the second pulse signal P2 normally. The first voltage V1 converted by the first conversion module 40 (such as the first conversion circuit composed of the first resistor R1 and the first capacitor C1) and the second voltage V2 converted by the second conversion module 50 (such as the second conversion circuit composed of the second resistor R2 and the second capacitor C2) are both greater than the threshold voltage Vt, and the output Out1 of the first comparator U1 and the output Out2 of the second comparator U2 are both low level (L). Therefore, the output of the first logic circuit 71 is a high level (H), and the third P-type transistor Q5 of the second logic circuit 72 is turned off (off). Therefore, the power Pr will not reach the drain of the third P-type transistor Q5 from the source of the third P-type transistor Q5, and will not affect the first reset signal Re1 and the second reset signal Re2.

[2] The second condition is that one of the master processor 20 and the slave processor 30 is abnormal (not operating properly). When one of the master processor 20 and the slave processor 30 is abnormal (e.g., fails), the abnormal one of the master processor 20 and the slave processor 30 outputs the corresponding one of the first pulse signal P1 and the second pulse signal P2, and the output of one of the first pulse signal P1 and the second pulse signal P2 is a low level (L).

One of the first voltage V1 converted by the first conversion module 40 (such as the first conversion circuit composed of the first resistor R1 and the first capacitor C1) and the second voltage V2 converted by the second conversion module 50 (such as the second conversion circuit composed of the second resistor R2 and the second capacitor C2) can be zero voltage (0V) or close to zero voltage and less than the threshold voltage Vt, wherein one of the output Out1 of the first comparator U1 and the output Out2 of the second comparator U2 is a low level (L). Therefore, the output Out3 of the first logic circuit 71 is a high level (H), and the third P-type transistor Q5 of the second logic circuit 72 is turned off (off). Therefore, the power Pr will not reach the drain of the third P-type transistor Q5 from the source of the third P-type transistor Q5, and will not affect the first reset signal Re1 and the second reset signal Re2.

If the master processor 20 is abnormal (not operating properly), the power management module 10 can obtain a message that the master processor 20 is abnormal via the first watchdog signal W1 (for example, the power management module 10 knows that the master processor 20 is in an abnormal state because the master processor 20 does not respond to the question raised by the first watchdog signal W1 with a relevant answer), and the power management module 10 sends the first reset signal Re1 to the master processor 20 for reset. In addition, if the slave processor 30 is abnormal (not operating properly), the master processor 20 can obtain a message that the slave processor 30 is abnormal via the second watchdog signal W2 (for example, the master processor 20 knows that the slave processor 30 is in an abnormal state because the slave processor 30 does not respond to the question raised by the second watchdog signal W2 with a relevant answer), and the master processor 20 sends the second reset signal Re2 to the slave processor 30 for reset.

[3] The third condition is that the power management module 10 is abnormal (not operating properly) or both the master processor 20 and the slave processor 30 are abnormal (not operating properly). When the power management module 10 is abnormal (e.g., crashes), or both the master processor 20 and the slave processor 30 are abnormal (e.g., fail), the reset terminal of the master processor 20 and the reset terminal of the slave processor 30 are both low level (L), the output of the first pulse signal P1 and the output of the second pulse signal P2 are both low level (L), the first voltage V1 converted by the first conversion module 40

(such as the first conversion circuit composed of the first resistor R1 and the first capacitor C1) and the second voltage V2 converted by the second conversion module 50 (such as the second conversion circuit composed of the second resistor R2 and the second capacitor C2) are both zero voltage (0V) or close to zero voltage and less than the threshold voltage Vt, and the output Out1 of the first comparator U1 and the output Out2 of the second comparator U2 are both high level (H). Therefore, the output Out3 of the first logic circuit 71 is a low level (L), and the third P-type transistor Q5 of the second logic circuit 72 is turned on (on). Therefore, the power Pr of the power management module 10 will reach the drain of the third P-type transistor Q5 from the source of the third P-type transistor Q5, so that the forced wake-up module 70 or the second logic circuit 72 outputs a high level (H) signal to the reset terminal of the master processor 20 and the reset terminal of the slave processor 30 to forcibly wake up the master processor 20 and the slave processor 30.

Figure 2:
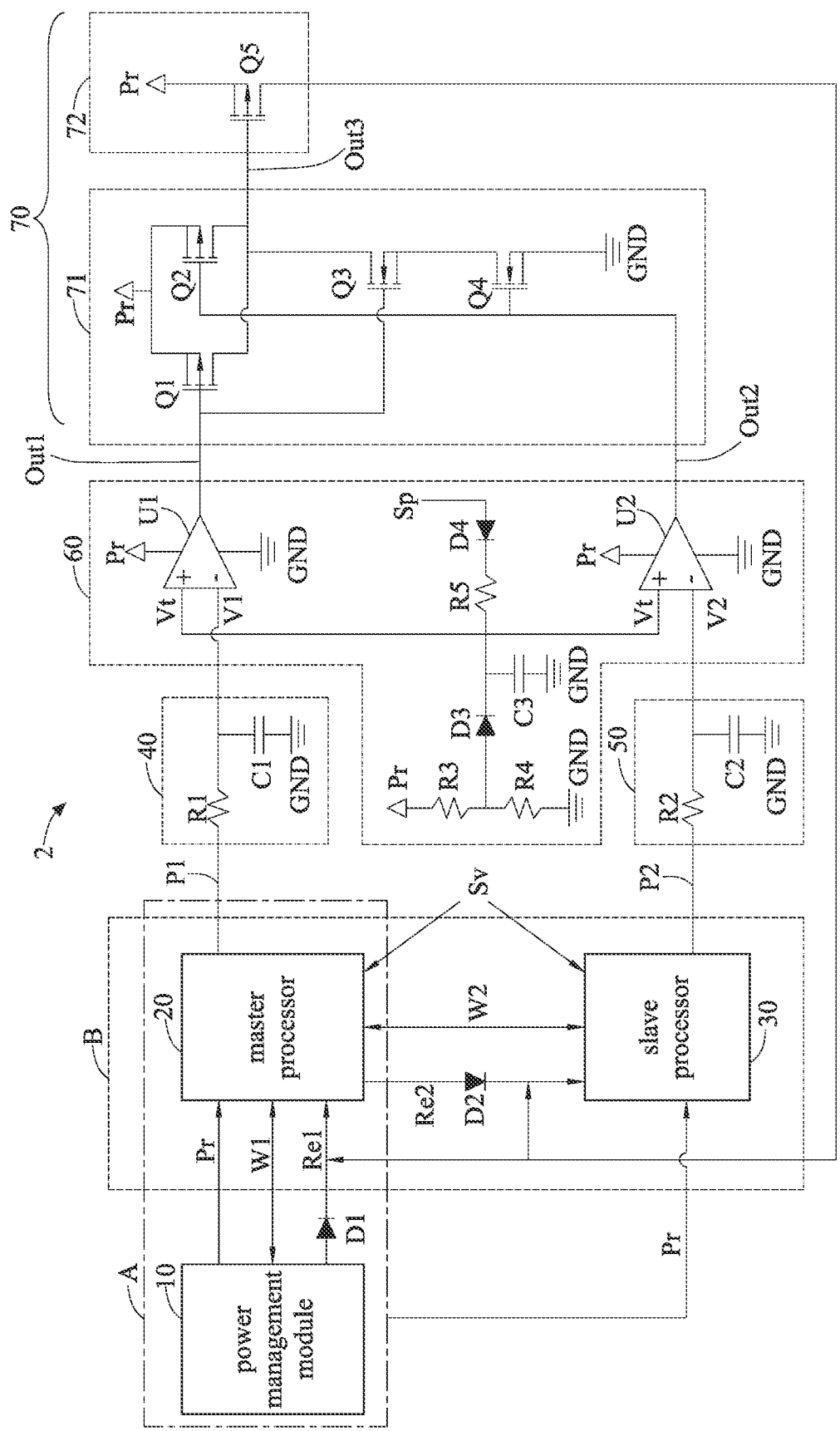
FIG. 2 is a schematic view of a second embodiment of a vehicle control device according to the present disclosure.
Figure 3:
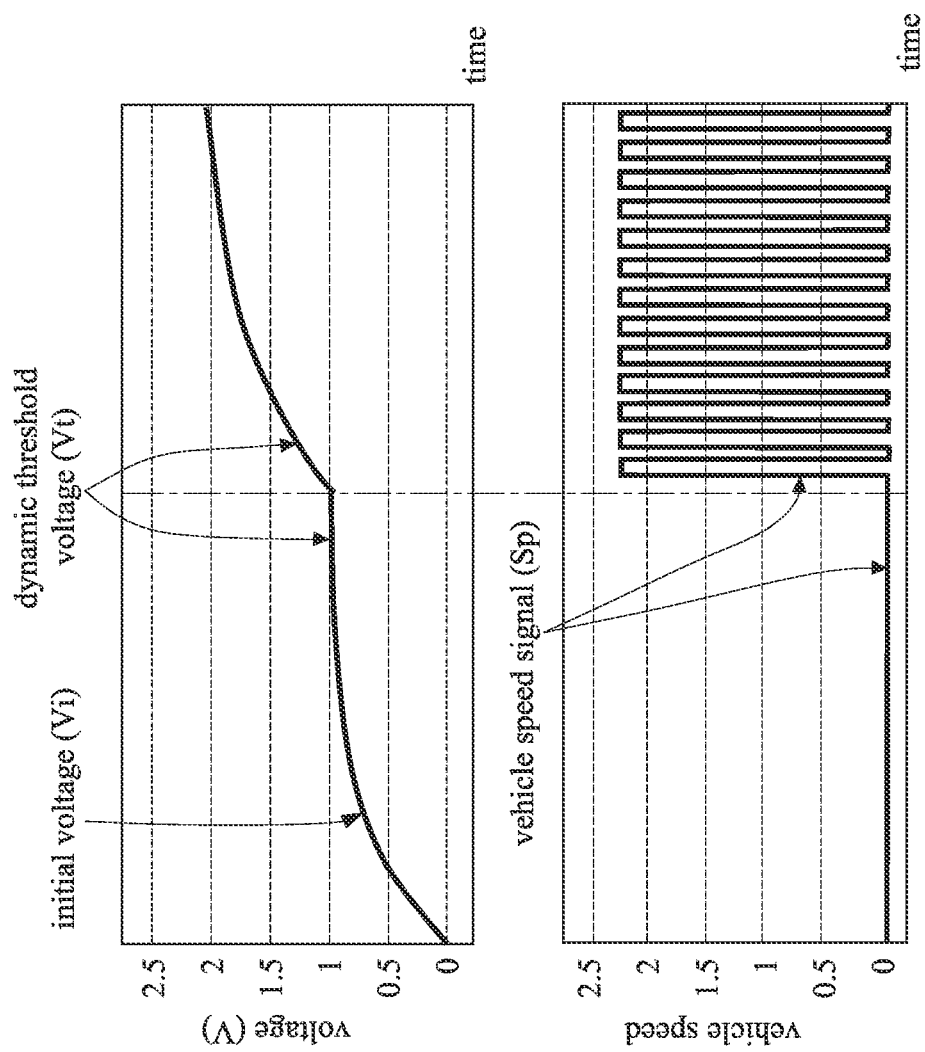
FIG. 3 is a schematic waveform view of a vehicle speed signal and a dynamic threshold voltage in the vehicle control device shown in FIG. 2 of the present disclosure.

FIG. 2 is a schematic view of a second embodiment of a vehicle control device 2 according to the present disclosure, and FIG. 3 is a schematic waveform view of a vehicle speed signal Sp and a dynamic threshold voltage Vt in the vehicle control device 2 shown in FIG. 2 of the present disclosure. The main difference between the vehicle control device 2 and the vehicle control device 1 shown in FIG. 1 is that the vehicle control device 2 can dynamically adjust the frequency (e.g., frequency rate) of both a first pulse signal P1 and a second pulse signal P2 according to the vehicle speed signal Sp of the vehicle, or dynamically adjust the threshold voltage Vt of both the first comparator U1 and the second comparator U2 according to the vehicle speed signal Sp of the vehicle. Meanwhile, the main contents of the vehicle control device 2 are as follows, and the rest of the contents are the same as those described with respect to FIG. 1 above, and will not be repeated here.

As shown in FIG. 2, the vehicle control device 2 may include a power management module 10, at least one master processor 20, at least one slave processor 30, a first conversion module 40, a second conversion module 50, a comparison module 60 and a forced wake-up module 70, and the forced wake-up module 70 may be composed of a first logic circuit 71 and a second logic circuit 72. In addition, the vehicle control device 2 or the comparison module 60 may further include a third capacitor C3, a fourth diode D4 and a fifth resistor R5, and can receive the vehicle speed signal Sp of the vehicle.

The power management module 10 can be connected to the master processor 20, the slave processor 30, the comparison module 60 and the forced wake-up module 70 (the first logic circuit 71 and the second logic circuit 72). The master processor 20 can be further connected to the slave processor 30, the first conversion module 40 or the forced wake-up module 70 (the second logic circuit 72), and the slave processor 30 can be further connected to the second conversion module 50 or the forced wake-up module 70 (the second logic circuit 72). The first conversion module 40 and the second conversion module 50 can be further connected to the first comparator U1 and the second comparator U2 of the comparison module 60, respectively. The comparison module 60 can be further connected to the first logic circuit 71 of the forced wake-up module 70, and the first logic circuit 71 can be further connected to the second logic circuit 72. The power management module 10 can provide power Pr to the master processor 20, the slave processor 30, the first conversion module 40, the second conversion module 50, the comparison module 60 and the forced wake-up module 70 (the first logic circuit 71 and the second logic circuit 72) and so on.

First, the power management module 10 and the master processor 20 form a first safety mechanism circuit A, which is beneficial to improve the security, monitoring, reset or forced wake-up capability between the power management module 10 and the master processor 20. The power management module 10 can monitor the master processor 20 via the first watchdog signal W1, and the first watchdog signal W1 can be a question-and-answer watchdog signal or the like. When the power management module 10 sends the first watchdog signal W1 (for example, a question is sent via the first watchdog signal W1) to the master processor 20, and the master processor 20 does not respond to the power management module 10 with a relevant message in response to the first watchdog signal W1 (e.g., not responding to this question with an answer), the power management module 10 will send a first reset signal Re1 to the master processor 20 for reset.

When the power management module 10 provides the power Pr to the master processor 20, the master processor 20 can dynamically adjust the frequency (e.g., frequency rate) of the first pulse signal P1 output by the master processor 20 according to the vehicle speed signal Sp (vehicle speed) of the vehicle to transmit the first pulse signal P1 to the first conversion module 40, and the first pulse signal P1 may be a pulse width modulation (PWM) signal or the like. For example, the master processor 20 can dynamically increase the frequency (e.g., frequency rate) of the first pulse signal P1 according to the increase of the vehicle speed signal Sp (vehicle speed) of the vehicle, or dynamically decrease the frequency (e.g., frequency rate) of the first pulse signal P1 according to the decrease of the vehicle speed signal Sp (vehicle speed) of the vehicle. In addition, a first diode D1 can be disposed between the power management module 10 and the reset terminal of the master processor 20, so as to control or limit the conduction direction of the first reset signal Re1 by the first diode D1, that is, the first reset signal Re1 is directed to the master processor 20 by the first diode D1, so as to prevent the first reset signal Re1 from being directed back to the power management module 10, thereby preventing the power management module 10 from being shorted by the first reset signal Re1.

Second, the master processor 20 and the slave processor 30 form a second safety mechanism circuit B, which is beneficial to improve system reliability or achieve a low failure rate. That is, the master processor 20 and the slave processor 30 can simultaneously receive, monitor or process at least one (or a plurality of) signal Sv of the vehicle based on the double safety mechanism or the redundant safety mechanism, so as to double the system reliability or achieve the low failure rate.

The master processor 20 can monitor the slave processor 30 via the second watchdog signal W2, and the second watchdog signal W2 can be a question-and-answer watchdog signal or the like. When the master processor 20 sends the second watchdog signal W2 (for example, a question is sent via the second watchdog signal W2) to the slave processor 30, and the slave processor 30 does not respond to the master processor 20 with a relevant message in response to the second watchdog signal W2 (e.g., not responding to this question with an answer), the master processor 20 will send a second reset signal Re2 to the slave processor 30 for reset.

When the power management module 10 provides the power Pr to the slave processor 30, the slave processor 30 can dynamically adjust the frequency (e.g., frequency rate) of the second pulse signal P2 output from the slave processor 30 according to the vehicle speed signal Sp (vehicle speed) of the vehicle to transmit the second pulse signal P2 to the second conversion module 50, and the second pulse signal P2 and the vehicle speed signal Sp can be respectively a pulse width modulation (PWM) signal and a vehicle speed pulse signal. For example, the slave processor 30 can dynamically increase the frequency (e.g., frequency rate) of the second pulse signal P2 according to the increase of the vehicle speed signal Sp (vehicle speed) of the vehicle, or dynamically decrease the frequency (e.g., frequency rate) of the second pulse signal P2 according to the decrease of the vehicle speed signal Sp (vehicle speed) of the vehicle. In addition, a second diode D2 can be disposed between a reset terminal of the master processor 20 and a reset terminal of the slave processor 30, so as to control or limit the conduction direction of the second reset signal Re2 by the second diode D2, that is, the second reset signal Re2 is directed to the slave processor 30 by the second diode D2 to prevent the second reset signal Re2 from being directed back to the master processor 20, thereby preventing the master processor 20 from being shorted by the second reset signal Re2.

Third, the first conversion module 40, the second conversion module 50 and the comparison module 60 form a monitoring circuit, which is beneficial to determine that an output Out1 of the first comparator U1 and an output Out2 of the second comparator U2 are high level (H) or low level (L) and can also effectively improve the system judgment ability.

The first conversion module 40 may have a first resistor R1 and a first capacitor C1 connected to each other (e.g., in parallel) to form a first conversion circuit, so as to convert the first pulse signal P1 with a dynamic frequency output by the master processor 20 into a first voltage V1 with a dynamic voltage value (i.e., an adjustable voltage value or a non-fixed voltage value) via the first conversion module 40 (such as the first conversion circuit composed of the first resistor R1 and the first capacitor C1). At the same time, the second conversion module 50 may have a second resistor R2 and a second capacitor C2 connected to each other (e.g., in parallel) to form a second conversion circuit, so as to convert the second pulse signal P2 with a dynamic frequency output by the slave processor 30 into a second voltage V2 with a dynamic voltage value (i.e., an adjustable voltage value or a non-fixed voltage value) via the second conversion module 50 (such as the second conversion circuit composed of the second resistor R2 and the second capacitor C2).

The comparison module 60 may have a third resistor R3 and a fourth resistor R4 connected to each other (e.g., in parallel) to form a voltage divider circuit, and the third resistor R3 and the fourth resistor R4 may have the same or different resistance values, so as to divide the voltage of the power Pr from the power management module 10 into an initial voltage Vi (as shown in FIG. 3, the voltage of 0 V to 1 V) as the initial threshold voltage Vt via the voltage divider circuit formed by the third resistor R3 and the fourth resistor R4.

The comparison module 60 may have a first comparator U1 and a second comparator U2, and a third diode D3 may also be selectively disposed between the third resistor R3 and the fourth resistor R4, so as to direct the threshold voltage Vt of the power Pr and its current to the first comparator U1 and the second comparator U2 via the third diode D3. Moreover, the third diode D3 can be connected to a first input terminal (e.g., a positive input terminal "+") of the first comparator U1 and a first input terminal (e.g., a positive input terminal "+") of the second comparator U2, respectively.

For example, when the vehicle control device 2 or the comparison module 60 has not received the vehicle speed signal Sp of the vehicle (for example, the vehicle speed is equal to zero), the voltage of the power Pr from the power management module 10 can be divided into an initial voltage Vi (as shown in FIG. 3, the voltage of 0 V to 1 V) as the initial threshold voltage Vt via the voltage divider circuit formed by the third resistor R3 and the fourth resistor R4, and the first input terminal (such as the positive input terminal "+") of the comparator U1 and the first input terminal (such as the positive input terminal "+") of the second comparator U2 first use the initial voltage Vi as the threshold voltage Vt. Then, when the vehicle control device 2 or the comparison module 60 has received the vehicle speed signal Sp of the vehicle (for example, the vehicle speed is not equal to zero), the vehicle speed signal Sp of the vehicle can be transmitted to a third conversion circuit composed of the fifth resistor R5 and the third capacitor C3 via a fourth diode D4, so as to convert the vehicle speed signal Sp of the vehicle into a threshold voltage Vt having a dynamic voltage value (i.e., an adjustable voltage value or a non-fixed voltage value) via the third conversion circuit composed of the fifth resistor R5 and the third capacitor C3. Moreover, the dynamic voltage value of the threshold voltage Vt can be increased with the increase of the vehicle speed signal Sp of the vehicle, so that the threshold voltage Vt is dynamically adjusted from the initial voltage Vi (as shown in FIG. 3, the voltage of 0 V to 1 V) to a higher threshold voltage (as shown in FIG. 3, the voltage of above 1 V). Afterwards, the dynamic voltage value of the threshold voltage Vt can increase with the increase of the vehicle speed signal Sp of the vehicle, or it can also become lower with the decrease of the vehicle speed signal Sp of the vehicle and is higher than the initial voltage Vi (such as the voltage of above 1 V).

The first conversion module 40 (such as the first conversion circuit composed of the first resistor R1 and the first capacitor C1) can be connected to a second input terminal (such as a negative input terminal "−") of the first comparator U1, so that the second input terminal (e.g., the negative input terminal "−") of the first comparator U1 has the first voltage V1 with a dynamic voltage value converted by the first conversion module 40 (such as the first conversion circuit composed of the first resistor R1 and the first capacitor C1). At the same time, the second conversion module 50 (such as the second conversion circuit composed of the second resistor R2 and the second capacitor C2) can be connected to a second input terminal (such as a negative input terminal "−") of the second comparator U2, so that the second input terminal (e.g., the negative input terminal "−") of the second comparator U2 has the second voltage V2 with a dynamic voltage value converted by the second conversion module 50 (such as the second conversion circuit composed of the second resistor R2 and the second capacitor C2).

When the first comparator U1 compares that the first voltage V1 is less than the threshold voltage Vt, the output Out1 of the first comparator U1 is a high level (H); and when the first comparator U1 compares that the first voltage V1 is greater than the threshold voltage Vt, the output of the first comparator U1 is a low level (L). Meanwhile, when the second comparator U2 compares that the second voltage V2 is less than the threshold voltage Vt, the output of the second comparator U2 is a high level (H); and when the second comparator U2 compares that the second voltage V2 is greater than the threshold voltage Vt, the output of the second comparator U2 is a low level (L).

Fourth, the first logic circuit 71 and the second logic circuit 72 of the forced wake-up module 70 form a forced wake-up circuit, which is beneficial to reset or forcibly wake up one or both of the master processor 20 and the slave processor 30. For example, the first logic circuit 71 may have a first P-type transistor Q1, a second P-type transistor Q2, a first N-type transistor Q3, a second N-type transistor Q4, etc., and the second logic circuit 72 may have a third P-type transistor Q5 and the like. The first logic circuit 71 may be a NAND gate logic circuit or the like, and the first P-type transistor Q1, the second P-type transistor Q2 or the third P-type transistor Q5 may be a P-type metal-oxide-semiconductor-field-effect transistor (MOSFET) or the like, and the first N-type transistor Q3 or the second N-type transistor Q4 may be an N-type metal-oxide-semiconductor-field-effect transistor (MOSFET) or the like.

An output terminal of the first comparator U1 is connected to a gate of the first P-type transistor Q1 and a gate of the first N-type transistor Q3, and an output terminal of the second comparator U2 is connected to a gate of the second P-type transistor Q2 and a gate of the second N-type transistor Q4. A source of the first P-type transistor Q1 and a source of the second P-type transistor Q2 are all connected to the power Pr of the power management module 10, and a drain of the first P-type transistor Q1, a drain of the second P-type transistor Q2 and a drain of the first N-type transistor Q3 are all connected to a gate of the third P-type transistor Q5. A source of the first N-type transistor Q3 is connected to a drain of the second N-type transistor Q4, a source of the second N-type transistor Q4 is connected to ground GND, a source of the third P-type transistor Q5 is connected to the power Pr of the power management module 10, and a drain of the third P-type transistor Q5 is connected to the reset terminal of the master processor 20 and the reset terminal of the slave processor 30.

For example, when an output Out3 of the first logic circuit 71 is a high level (H), the third P-type transistor Q5 is turned off (off). Therefore, the power Pr of the power management module 10 will not reach the drain of the third P-type transistor Q5 from the source of the third P-type transistor Q5, and will not affect the first reset signal Re1 and the second reset signal Re2. Conversely, the output Out3 of the first logic circuit 71 is a low level (L), the third P-type transistor Q5 is turned on (on) to output a high level (H) signal to the reset terminal of the master processor 20 and the reset terminal of the slave processor 30, so as to wake up the master processor 20 and the slave processor 30 forcibly.

The following will be as follows: [1] The first condition is that both the master processor 20 and the slave processor 30 are operating normally, [2] The second condition is that one of the master processor 20 and the slave processor 30 is abnormal (not operating properly), [3] The third condition is that the power management module 10 is abnormal (not operating properly) or both the master processor 20 and the slave processor 30 are abnormal (not operating properly), and are described with referring to an input and output table for the three conditions shown in Table 1 above.

[1] The first condition is that both the master processor 20 and the slave processor 30 operate normally. When both the master processor 20 and the slave processor 30 operate normally, the master processor 20 and the slave processor 30 respectively output the first pulse signal P1 and the second pulse signal P2 normally. The first voltage V1 converted by the first conversion module 40 (such as the first conversion circuit composed of the first resistor R1 and the first capacitor C1) and the second voltage V2 converted by the second conversion module 50 (such as the second conversion circuit composed of the second resistor R2 and the second capacitor C2) are both greater than the threshold voltage Vt, and the output Out1 of the first comparator U1 and the output Out2 of the second comparator U2 are both low level (L). Therefore, the output of the first logic circuit 71 is a high level (H), and the third P-type transistor Q5 of the second logic circuit 72 is turned off (off). Therefore, the power Pr of the power management module 10 will not reach the drain of the third P-type transistor Q5 from the source of the third P-type transistor Q5, and will not affect the first reset signal Re1 and the second reset signal Re2.

[2] The second condition is that one of the master processor 20 and the slave processor 30 is abnormal (not operating properly). When one of the master processor 20 and the slave processor 30 is abnormal (e.g., fails), the abnormal one of the master processor 20 and the slave processor 30 outputs the corresponding one of the first pulse signal P1 and the second pulse signal P2, and the output of one of the first pulse signal P1 and the second pulse signal P2 is a low level (L) or below a frequency threshold value. One of the first voltage V1 converted by the first conversion module 40 (such as the first conversion circuit composed of the first resistor R1 and the first capacitor C1) and the second voltage V2 converted by the second conversion module 50 (such as the second conversion circuit composed of the second resistor R2 and the second capacitor C2) can be zero voltage (0 V) or close to zero voltage and less than the threshold voltage Vt, wherein one of the output Out1 of the first comparator U1 and the output Out2 of the second comparator U2 is a low level (L). Therefore, the output Out3 of the first logic circuit 71 is a high level (H), and the third P-type transistor Q5 of the second logic circuit 72 is turned off (off). Therefore, the power Pr of the power management module 10 will not reach the drain of the third P-type transistor Q5 from the source of the third P-type transistor Q5, and will not affect the first reset signal Re1 and the second reset signal Re2.

If the master processor 20 is abnormal (not operating properly), the power management module 10 can obtain a message that the master processor 20 is abnormal via the first watchdog signal W1 (for example, the power management module 10 knows that the master processor 20 is in an abnormal state because the master processor 20 does not respond to the question raised by the first watchdog signal W1 with a relevant answer), and the power management module 10 sends the first reset signal Re1 to the master processor 20 for reset. In addition, if the slave processor 30 is abnormal (not operating properly), the master processor 20 can obtain a message that the slave processor 30 is abnormal via the second watchdog signal W2 (for example, the master processor 20 knows that the slave processor 30 is in an abnormal state because the slave processor 30 does not respond to the question raised by the second watchdog signal W2 with a relevant answer), and the master processor 20 sends the second reset signal Re2 to the slave processor 30 for reset.

[3] The third condition is that the power management module 10 is abnormal (not operating properly) or both the master processor 20 and the slave processor 30 are abnormal (not operating properly). When the power management module 10 is abnormal (e.g., crashes), or both the master processor 20 and the slave processor 30 are abnormal (e.g., fail), the reset terminal of the master processor 20 and the reset terminal of the slave processor 30 are both low level (L), the output of the first pulse signal P1 and the output of the second pulse signal P2 are both low level (L) or below frequency threshold value, the first voltage V1 converted by the first conversion module 40 (such as the first conversion circuit composed of the first resistor R1 and the first capacitor C1) and the second voltage V2 converted by the second conversion module 50 (such as the second conversion circuit composed of the second resistor R2 and the second capacitor C2) are both zero voltage (0 V) or close to zero voltage and less than the threshold voltage Vt, and the output Out 1 of the first comparator U1 and the output Out2 of the second comparator U2 are both high level (H). Therefore, the output Out3 of the first logic circuit 71 is a low level (L), and the third P-type transistor Q5 of the second logic circuit 72 is turned on (on). Therefore, the power Pr of the power management module 10 will reach the drain of the third P-type transistor Q5 from the source of the third P-type transistor Q5, so that the forced wake-up module 70 or the second logic circuit 72 outputs a high level (H) signal to the reset terminal of the master processor 20 and the reset terminal of the slave processor 30 to forcibly wake up the master processor 20 and the slave processor 30.

Figure 4:
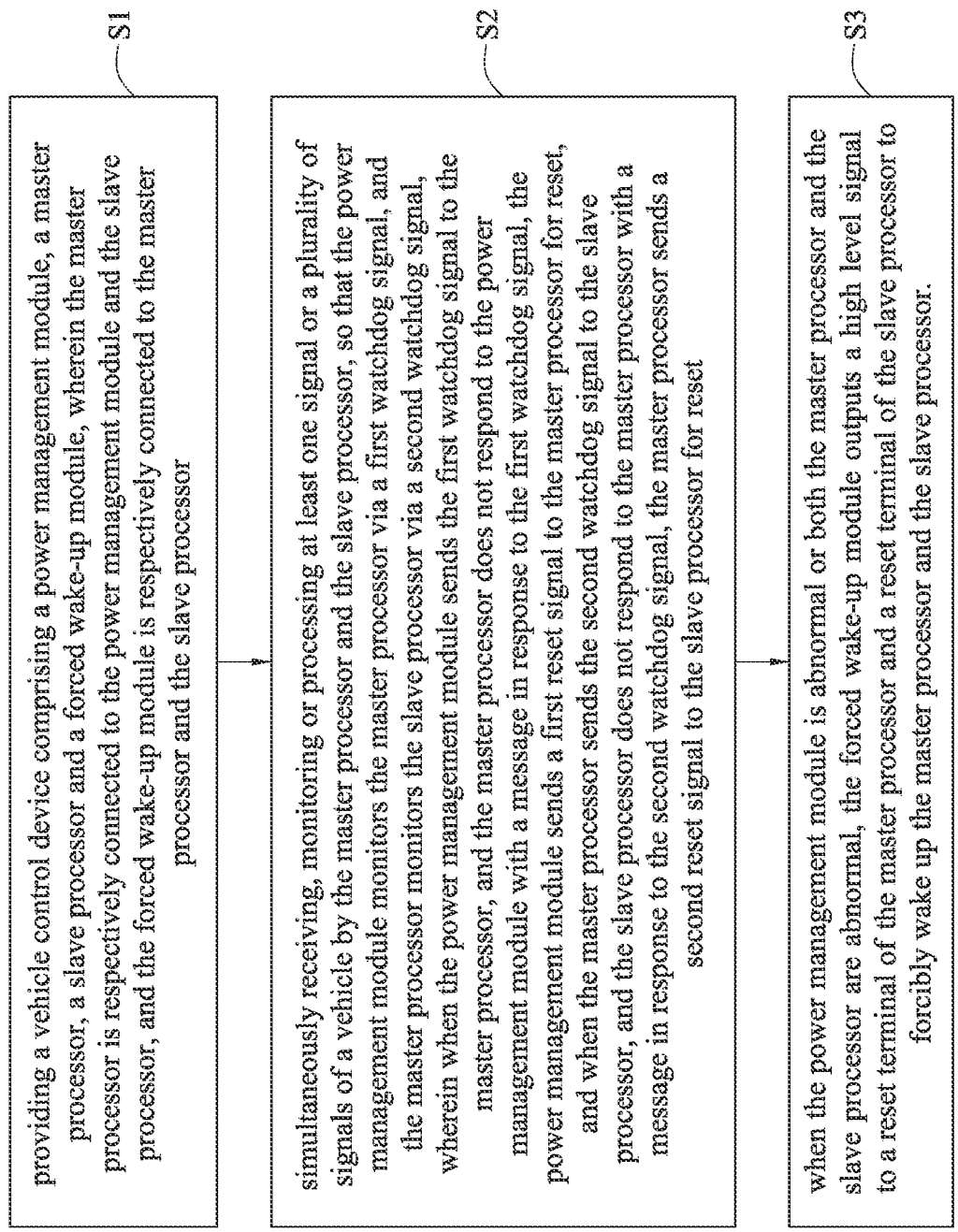
FIG. 4 is a schematic flowchart of a vehicle control method according to the present disclosure.

FIG. 4 is a schematic flowchart of a vehicle control method according to the present disclosure, and is described with reference to FIG. 1 or FIG. 2. Meanwhile, the main content of the vehicle control method is as follows, and the rest of the content is the same as those described with respect to FIG. 1 or FIG. 2 above, and will not be repeated here.

As shown in step S1 of FIG. 4 and FIG. 1 to FIG. 2, a vehicle control device 1 (2) including a power management module 10, a master processor 20, a slave processor 30 and a forced wake-up module 70 is provided, the master processor 20 is connected to the power management module 10 and the slave processor 30 respectively, and the forced wake-up module 70 is connected to the master processor 20 and the slave processor 30 respectively.

As shown in step S2 of FIG. 4 and FIG. 1 to FIG. 2, the master processor 20 and the slave processor 30 simultaneously receive, monitor or process at least one (or a plurality of) signal Sv of the vehicle, and the power management module 10 monitors the master processor 20 via the first watchdog signal W1, and the master processor 20 monitors the slave processor 30 via the second watchdog signal W2. When the power management module 10 sends the first watchdog signal W1 to the master processor 20, and the master processor 20 does not respond to the power management module 10 with a message in response to the first watchdog signal W1, the power management module 10 will send a first reset signal Re1 to the master processor 20 for reset, and when the master processor 20 sends the second watchdog signal W2 to the slave processor 30, and the slave processor 30 does not respond to the master processor 20 with a message in response to the second watchdog signal W2, the master processor 20 will send a second reset signal Re2 to the slave processor 30 for reset.

As shown in step S3 of FIG. 4 and FIG. 1 to FIG. 2, when the power management module 10 is abnormal (not operating properly), or both the master processor 20 and the slave processor 30 are abnormal (not operating properly), the forced wake-up module 70 outputs a high level (H) signal to the reset terminal of the master processor 20 and the reset terminal of the slave processor 30 to forcibly wake up the master processor 20 and the slave processor 30.

As shown in FIG. 2, when the vehicle control device 2 has received the vehicle speed signal Sv of the vehicle, the conversion circuit composed of the fifth resistor R5 and the third capacitor C3 converts the vehicle speed signal Sv of the vehicle into a threshold voltage Vt having a dynamic voltage value, and the dynamic voltage value of the threshold voltage Vt increases as the vehicle speed signal Sv of the vehicle increases, or decreases as the vehicle speed signal Sv of the vehicle decreases.

As shown in FIG. 1 to FIG. 2, when one of the master processor 20 and the slave processor 30 is abnormal (not operating properly), the abnormal one of the master processor 20 and the slave processor 30 outputs the corresponding one of the first pulse signal P1 and the second pulse signal P2, and the output of one of the first pulse signal P1 and the second pulse signal P2 is a low level (H). If the master processor 20 is abnormal (not operating normally), the power management module 10 sends a first reset signal Re1 to the master processor 20 for reset. If the slave processor 30 is abnormal (not operating normally), the master processor 20 sends a second reset signal Re2 to the slave processor 30 for reset.

To sum up, the vehicle control device and the method thereof according to the present disclosure at least have the following features, advantages or technical effects.

First, the power management module and the master processor of the present disclosure form a safety mechanism circuit, which is beneficial to improve the security, monitoring, reset or forced wake-up capability between the power management module and the master processor.

Second, the master processor and the slave processor of the present disclosure form a safety mechanism circuit, which can simultaneously receive, monitor or process various signals of the vehicle based on the double safety mechanism or the redundant safety mechanism, so as to double the reliability of the system or achieve a low failure rate.

Third, the first conversion module, the second conversion module and the comparison module of the present disclosure form a monitoring circuit, which is beneficial to determine whether the output of the first comparator and the output of the second comparator are high level or low level, and can also effectively improve the system judgment ability.

Fourth, the first logic circuit and the second logic circuit of the forced wake-up module of the present disclosure form a forced wake-up circuit, which is beneficial to reset or forcibly wake up the master processor and/or the slave processor.

Fifth, the present disclosure can solve the problem that the master processor, the slave processor or the power management module are easily disturbed or influenced by various factors (such as electromagnetic waves, temperature, humidity, noise, impact, aging, etc.) in a harsh environment of the vehicle, resulting in abnormal (such as failure) situations.

Sixth, the present disclosure can improve the system reliability or achieve a low failure rate, can also meet the requirements of various safety standards (for example, ISO26262), and has the advantages of small circuit area and low cost.

Seventh, the present disclosure can dynamically adjust the threshold voltages of the first comparator and the second comparator according to the vehicle speed signal of the vehicle, so that the dynamic threshold voltage can be used to help determine whether the master processor or the slave processor can operate normally or process the first/second pulse signal in time.

The foregoing embodiments are used for the purpose of illustrating the principles and effects rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A vehicle control device, comprising:
   a power management module;
   a master processor and a slave processor simultaneously receiving, monitoring or processing at least one signal of a vehicle, wherein the master processor is respectively connected to the power management module and the slave processor, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and
   a forced wake-up module respectively connected to the master processor and the slave processor, wherein when the power management module is abnormal or both the master processor and the slave processor are abnormal, the forced wake-up module outputs a high level signal to a reset terminal of the master processor and a reset terminal of the slave processor to forcibly wake up the master processor and the slave processor.

2. The vehicle control device of claim 1, further comprising a first diode disposed between the power management module and the reset terminal of the master processor to control or limit a conduction direction of the first reset signal by the first diode, wherein the first diode directs the first reset signal to the master processor to prevent the first reset signal from being directed back to the power management module.

3. The vehicle control device of claim 2, further comprising a second diode disposed between the reset terminal of the master processor and the reset terminal of the slave processor to control or limit a conduction direction of the second reset signal, wherein the second diode directs the second reset signal to the slave processor to prevent the second reset signal from being directed back to the master processor.

4. The vehicle control device of claim 1, further comprising a first conversion module and a second conversion module respectively connected to the master processor and the slave processor, wherein when the power management module provides a power to the master processor, the master processor outputs a first pulse signal to the first conversion module to convert the first pulse signal output by the master processor into a first voltage via the first conversion module, and wherein when the power management module provides the power to the slave processor, the slave processor outputs a second pulse signal to the second conversion module to convert the second pulse signal output by the slave processor into a second voltage via the second conversion module.

5. The vehicle control device of claim 4, further comprising a comparison module having a first comparator and a second comparator, and the first comparator and the second comparator being respectively connected to the first conversion module and the second conversion module, wherein when the first comparator compares that the first voltage is less than a threshold voltage, an output of the first comparator is a high level, and when the first comparator compares that the first voltage is greater than the threshold voltage, the output of the first comparator is a low level, and wherein when the second comparator compares that the second voltage is less than the threshold voltage, an output of the second comparator is a high level, and when the second comparator compares that the second voltage is greater than the threshold voltage, the output of the second comparator is a low level.

6. The vehicle control device of claim 5, further comprising a voltage divider circuit composed of a resistor and another resistor, wherein the voltage divider circuit is connected to the power management module to divide a voltage of the power from the power management module into the threshold voltage via the voltage divider circuit.

7. The vehicle control device of claim 1, wherein the forced wake-up module is composed of a first logic circuit and a second logic circuit connected to each other, wherein the first logic circuit has a first P-type transistor, a second P-type transistor, a first N-type transistor and a second N-type transistor connected to each other, wherein the second logic circuit has a third P-type transistor, and wherein when an output of the first logic circuit is a low level, the third P-type transistor of the second logic circuit is turned on, such that a power of the power management module reaches a drain of the third P-type transistor from a source of the third P-type transistor, such that the forced wake-up module or the second logic circuit outputs a high level signal to the reset terminal of the master processor and the reset terminal of the slave processor to forcibly wake up the master processor and the slave processor.

8. The vehicle control device of claim 1, wherein when one of the master processor and the slave processor is abnormal, the abnormal one of the master processor and the slave processor outputs corresponding one of a first pulse signal and a second pulse signal, and an output of one of the first pulse signal and the second pulse signal is a low level, if the master processor is abnormal, the power management module sends the first reset signal to the master processor for reset, and if the slave processor is abnormal, the master processor sends the second reset signal to the slave processor for reset.

9. A vehicle control device, comprising:
   a power management module;
   a master processor and a slave processor simultaneously receiving, monitoring or processing at least one signal of a vehicle, wherein the master processor and the slave processor dynamically adjust a frequency of a first pulse signal and a frequency of a second pulse signal respectively output by the master processor and the slave processor according to a vehicle speed signal of the vehicle, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and a forced wake-up module respectively connected to the master processor and the slave processor, wherein when the power management module is abnormal or both the master processor and the slave processor are abnormal, the forced wake-up module outputs a high level signal to a reset terminal of the master processor and a reset terminal of the slave processor to forcibly wake up the master processor and the slave processor.

10. The vehicle control device of claim 9, further comprising a first diode disposed between the power management module and the reset terminal of the master processor to control or limit a conduction direction of the first reset signal by the first diode, wherein the first diode directs the first reset signal to the master processor to prevent the first reset signal from being directed back to the power management module.

11. The vehicle control device of claim 10, further comprising a second diode disposed between the reset terminal of the master processor and the reset terminal of the slave processor to control or limit a conduction direction of the second reset signal, wherein the second diode directs the second reset signal to the slave processor to prevent the second reset signal from being directed back to the master processor.

12. The vehicle control device of claim 9, further comprising a first conversion module and a second conversion module respectively connected to the master processor and the slave processor, wherein when the power management module provides a power to the master processor, the master processor dynamically adjusts the frequency of the first pulse signal output by the master processor according to the vehicle speed signal of the vehicle to transmit the first pulse signal to the first conversion module, and wherein when the power management module provides the power to the slave processor, the slave processor dynamically adjusts the frequency of the second pulse signal output by the slave processor according to the vehicle speed signal of the vehicle to transmit the second pulse signal to the second conversion module.

13. The vehicle control device of claim 12, further comprising a comparison module having a first comparator and a second comparator, and the first comparator and the second comparator being respectively connected to the first conversion module and the second conversion module, wherein when the first comparator compares that a first voltage converted by the first conversion module according to the first pulse signal is less than a threshold voltage, an output of the first comparator is a high level, and when the first comparator compares that the first voltage is greater than the threshold voltage, the output of the first comparator is a low level, and wherein when the second comparator compares that a second voltage converted by the second conversion module according to the second pulse signal is less than the threshold voltage, an output of the second comparator is a high level, and when the second comparator compares that the second voltage is greater than the threshold voltage, the output of the second comparator is a low level.

14. The vehicle control device of claim 12, further comprising a conversion circuit, wherein when the vehicle control device has received the vehicle speed signal of the vehicle, the conversion circuit converts the vehicle speed signal of the vehicle into a threshold voltage with a dynamic voltage value, and wherein the dynamic voltage value of the threshold voltage becomes higher as the vehicle speed signal of the vehicle increases, or becomes lower as the vehicle speed signal of the vehicle decreases.

15. The vehicle control device of claim 9, further comprising a voltage divider circuit composed of a resistor and another resistor, wherein the voltage divider circuit is connected to the power management module to divide a voltage of the power from the power management module into a threshold voltage via the voltage divider circuit.

16. The vehicle control device of claim 9, wherein the forced wake-up module is composed of a first logic circuit and a second logic circuit connected to each other, wherein the first logic circuit has a first P-type transistor, a second P-type transistor, a first N-type transistor and a second N-type transistor connected to each other, wherein the second logic circuit has a third P-type transistor, and wherein when an output of the first logic circuit is a low level, the third P-type transistor of the second logic circuit is turned on, such that a power of the power management module reaches a drain of the third P-type transistor from a source of the third P-type transistor, such that the forced wake-up module or the second logic circuit outputs a high level signal to the reset terminal of the master processor and the reset terminal of the slave processor to forcibly wake up the master processor and the slave processor.

17. The vehicle control device of claim 9, wherein when one of the master processor and the slave processor is abnormal, the abnormal one of the master processor and the slave processor outputs corresponding one of the first pulse signal and the second pulse signal, and an output of one of the first pulse signal and the second pulse signal is a low level, if the master processor is abnormal, the power management module sends the first reset signal to the master processor for reset, and if the slave processor is abnormal, the master processor sends the second reset signal to the slave processor for reset.

18. A vehicle control method, comprising:
providing a vehicle control device comprising a power management module, a master processor, a slave processor and a forced wake-up module, wherein the master processor is respectively connected to the power management module and the slave processor, and the forced wake-up module is respectively connected to the master processor and the slave processor;
simultaneously receiving, monitoring or processing at least one signal of a vehicle by the master processor and the slave processor, wherein the power management module monitors the master processor via a first watchdog signal, and the master processor monitors the slave processor via a second watchdog signal, wherein when the power management module sends the first watchdog signal to the master processor, and the master processor does not respond to the power management module with a message in response to the first watchdog signal, the power management module sends a first reset signal to the master processor for reset, and wherein when the master processor sends the second watchdog signal to the slave processor, and the slave processor does not respond to the master processor with a message in response to the second watchdog signal, the master processor sends a second reset signal to the slave processor for reset; and
outputting a high level signal to a reset terminal of the master processor and a reset terminal of the slave processor by the forced wake-up module to forcibly wake up the master processor and the slave processor when the power management module is abnormal or both the master processor and the slave processor are abnormal.

19. The vehicle control method of claim 18, further comprising converting a vehicle speed signal of the vehicle into a threshold voltage with a dynamic voltage value by a conversion circuit when the vehicle control device has received the vehicle speed signal of the vehicle, wherein the dynamic voltage value of the threshold voltage becomes higher as the vehicle speed signal of the vehicle increases, or becomes lower as the vehicle speed signal of the vehicle decreases.

20. The vehicle control method of claim 18, wherein when one of the master processor and the slave processor is abnormal, the abnormal one of the master processor and the slave processor outputs corresponding one of a first pulse signal and a second pulse signal, wherein an output of one of the first pulse signal and the second pulse signal is a low level, if the master processor is abnormal, the power management module sends the first reset signal to the master processor for reset, and if the slave processor is abnormal, the master processor sends the second reset signal to the slave processor for reset.

* * * * *